No. 833,873. PATENTED OCT. 23, 1906.
J. E. COCHRAN & O. L. PLUMTREE.
WEIGHING SCALE.
APPLICATION FILED AUG. 14, 1905.
3 SHEETS—SHEET 1.
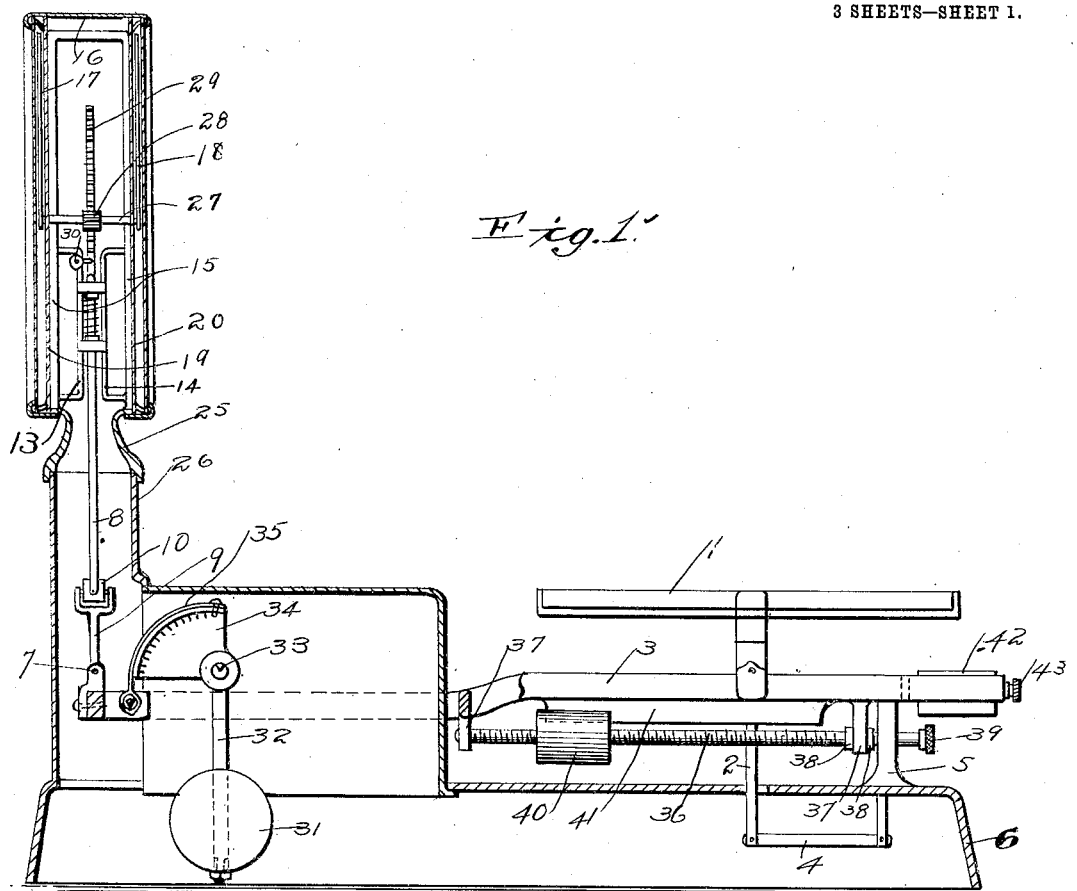
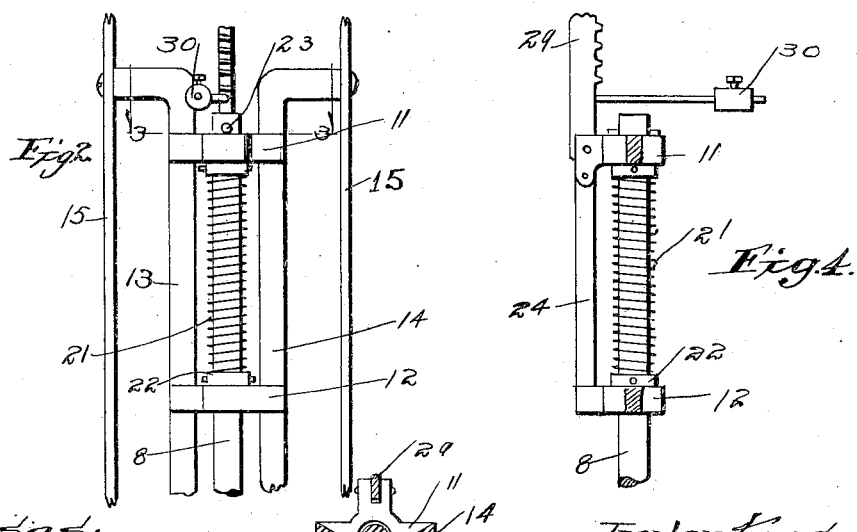
Witnesses:
E. C. Semple
Ernest A. Baughman
Inventors
Joseph E. Cochran and
Oliver L. Plumtree by
Brown Darby & Hopkins Attys No. 833,873. PATENTED OCT. 23, 1906.
J. E. COCHRAN & O. L. PLUMTREE.
WEIGHING SCALE.
APPLICATION FILED AUG. 14, 1905.
3 SHEETS—SHEET 2.
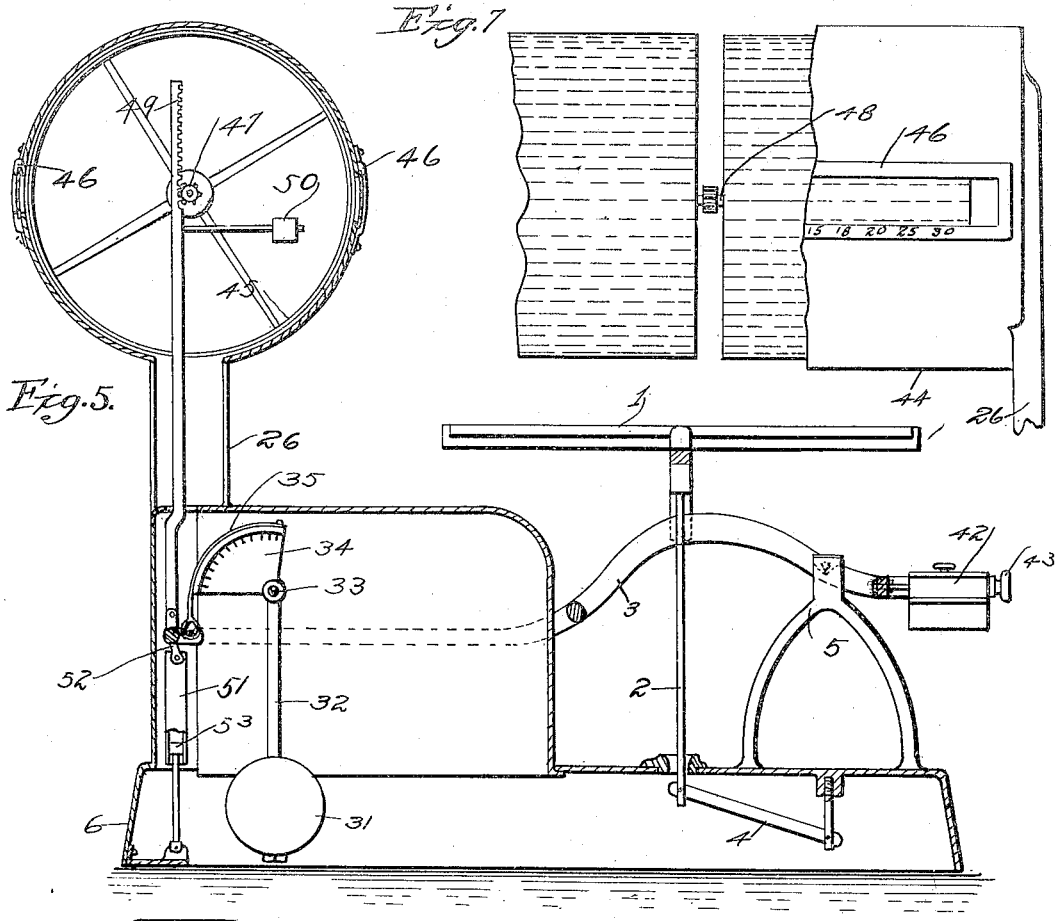
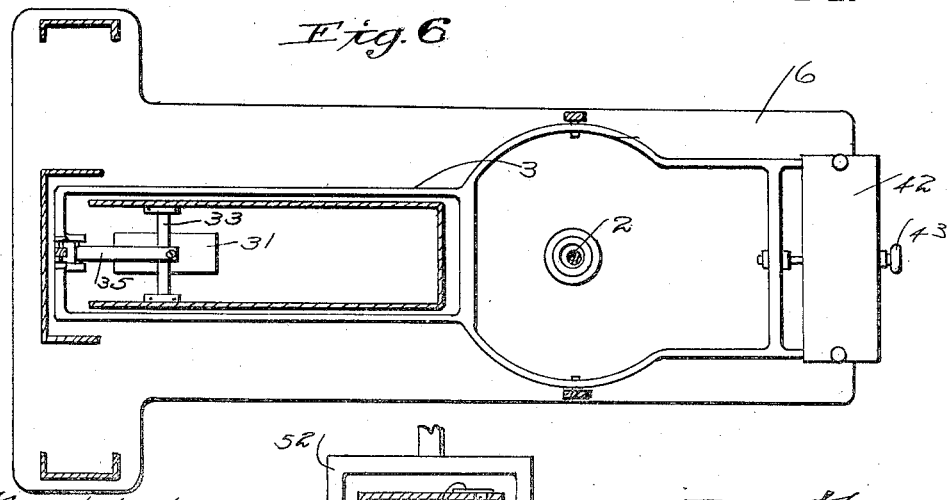
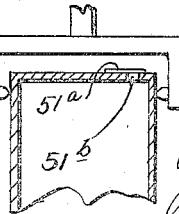
Witnesses:
E. C. Semple
Ernest A. Baughman
Inventors:
Joseph E. Cochran and
Oliver L. Plumtree by
Brown Darby & Hopkins Attys No. 833,873. PATENTED OCT. 23, 1906.
J. E. COCHRAN & O. L. PLUMTREE.
WEIGHING SCALE.
APPLICATION FILED AUG. 14, 1905.
3 SHEETS—SHEET 3.
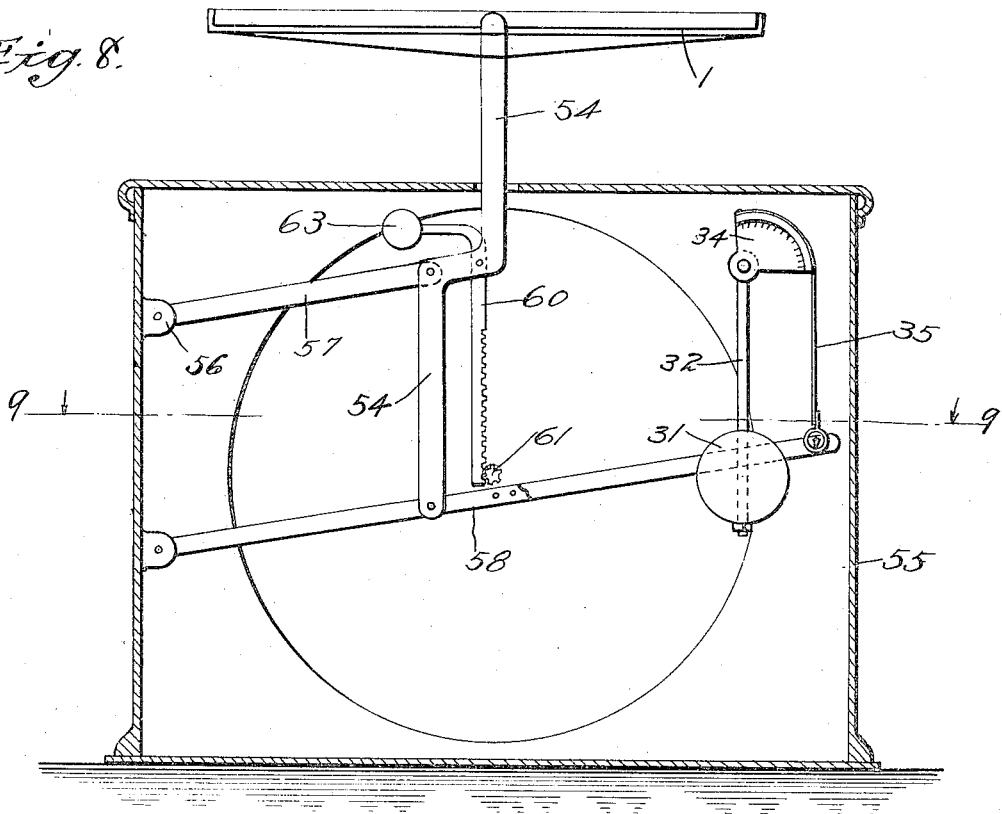
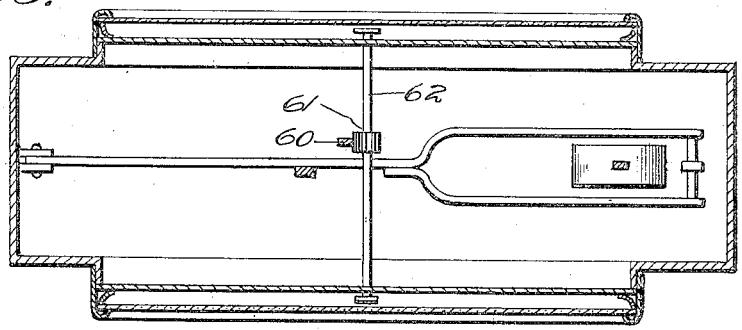

UNITED STATES PATENT OFFICE.

JOSEPH E. COCHRAN AND OLIVER L. PLUMTREE, OF CHICAGO, ILLINOIS; SAID PLUMTREE ASSIGNOR TO SAID COCHRAN.

WEIGHING-SCALE.

No. 833,373.   Specification of Letters Patent.   Patented Oct. 23, 1906.

Application filed August 14, 1905. Serial No. 274,064.

*To all whom it may concern:*

Be it known that we, JOSEPH E. COCHRAN and OLIVER L. PLUMTREE, citizens of the United States, residing at Chicago, in the county of Cook and State of Illinois, have invented a new and useful Improvement in Weighing-Scales, of which the following is a specification.

This invention relates to that class of weighing-scales more especially adapted for counter use for weighing small quantities of merchandise in which the depression of the merchandise pan or platform is resisted by a pendulum-like weight; and the invention has for its object to provide an improved scale of this character which will possess the maximum degree of accuracy and be convenient in use and simple and durable in construction.

With a view to the attainment of these ends and the accomplishment of certain other objects which will hereinafter appear the invention consists in the features of novelty in the construction, combination, and arrangement of parts, which will now be described with reference to the accompanying drawings and more particularly pointed out in the claims.

In the said drawings, Figure 1 is a vertical longitudinal sectional view of a scale embodying this invention. Fig. 2 is an enlarged side elevation of a portion of the mechanism hereinafter described. Fig. 3 is a cross-section thereof on the line 3 3, Fig. 2.
Fig. 4 is a side view of the same mechanism looking from the right in Fig. 2. Fig. 5 is a view similar to Fig. 1, showing certain modifications hereinafter described. Fig. 6 is a plan view of the form shown in Fig. 1 with the casing in section. Fig. 6ª is an enlarged detail section of a portion of the dash-pot and its connecting means. Fig. 7 is a side elevation of the registering cylinder or index used with the form shown in Fig. 5. Figs. 8 and 9 are views of further modified forms, 8 being a vertical section, and 9 a plan section, on the line 9 9, Fig. 8.

1 is the merchandise pan or platform supported by a standard 2 in any suitable manner—as, for example, by pivoting the standard to the scale-beam 3 near its upper end and at its lower end to a pivoted arm 4, constituting a parallel movement for maintaining the equilibrium of the standard as the beam 3 rocks on its knife-edge or pivotal support on standard 5, rising from base 6 in a manner familiar to those skilled in this art. The opposite end of the beam 3 has pivotal connection 7 with a vertically-reciprocatory rod 8 through the intermediary of a link 9 and a universal joint 10 of any suitable form, and the upper end of this rod 8 passes through two slides 11 12, which are confined and guided by vertical ways 13 14, secured in any suitable manner to a frame 15 within a casing 16, which carries the mechanism for directly actuating the pointers or indexes of the scale, two of the latter being shown at 17 18 on opposite sides of the casing 16 in connection with two dials 19 20, respectively. The rod 8 is provided with a spring 21, which is supported upon the rod at its lower end by a collar 22 and bears at its upper end against the under side of the slide 11, the latter, if desired, being limited in its upward movement on the rod 8 by a stop-pin 23.

When a weight is imposed upon the platform 1, the rod 8 is pulled downwardly, causing the slides 11 12 to run between their guideways 13 14. This downward motion is imparted directly to the slide 12 by the pressure of the collar 22, and the downward movement of the slide 12 is imparted to the slide 11 directly by a link or suitable connection 24, the spring 21 serving merely as a means of spacing the two guides 11 12 with respect to each other, making them accurately responsive to the movement of the rod 8 without having the joint or connection between the rod and said slides so rigid or tight as to interfere with free rotary movement of the slides 11 12 on the rod 8 when the casing 16 is rotated on its vertical axis for presenting either dial in any desired direction most convenient for reading, it being observed that the casing 16 is formed with a neck 25, journaled on a hollow standard 26 on the main casing of the scale and upwardly through which standard passes the rod 8. It will thus be seen that while the downward movement of the rod 8 is imparted directly to the slides 11 12 by the collar 22 and the stop-pin 23, if the latter be employed, and in any event by the connection 24, the upward motion of the rod 8 is imparted to these slides through the intermediary of the spring 21, which bears directly against the under side of the slide 11 and lifts the slide 12 through the medium of the connection 24.

The movement of one of these slides is imparted to the pointers or indexes 17 18 through the intermediary of the shaft 27, on which the indexes are secured, a pinion 28 on said shaft and a rack-bar 29 engaging the pinion and having pivotal connection with the slide 11, so that it will move vertically with the slide and may be maintained in accurate but easy contact with the pinion by a laterally-extended weight 30. When the casing 16 is rotated, it will be seen that inasmuch as the rod 8 is situated on the vertical axis of the casing all of the mechanism contained within the casing, including the rack-bar 29 and its associated parts, will revolve around the rod 8 and will be in readiness to perform their allotted functions in any position in which the casing 16 may be left.

The downward movement of the scale 10 or platform 1 is resisted by a pendulum-weight 31, secured to the lower end of an arm 32, depending from a suitable rocker-shaft 33, which also carries an involute cam 34, the beam 3 being connected to this cam by means of a strap 35, supported on the working surface or periphery thereof.

36 is a tare-beam, which is in the form of a rotary screw, supported in suitable bearings 37 and held against longitudinal movement by collars or shoulders 38, one end of the screw having an operating-knob 39. On this beam is mounted a weight 40 in which the screw is screw-threaded, and entering the side of the weight is a rib or fin 41, formed along the bottom of the scale-beam 3, so that as the screw 36 is rotated the weight 40 will be moved longitudinally thereof, while held against rotating therewith by the fin 41.

42 is any suitable counterbalance mounted on the rear end of the beam 3 and susceptible of adjustment by a screw 43.

In the form of the invention shown in Fig. 5 the hollow standard 26 has rigidly secured thereto a cylindrical casing 44, which is arranged in a horizontal position and within which is journaled a rotary cylinder 45, on whose periphery are indicated the numerals or characters representing weight or the price of the merchandise to be weighed, as shown in Fig. 7. The casing 44 may be provided on one or both sides with longitudinal windows or apertures 46, through which the markings on the periphery of the cylinder 45 are visible as the cylinder is rotated by the imposition of the weight upon the platform 1. The motion of the platform 1 is thus imparted to the cylinder by means of a pinion 47 on shaft 48 of the cylinder, a rack-bar 49 engaging said pinion and having its lower end pivoted to scale-beam 3 and being provided with a laterally-extended weight 50 for holding it in contact with the pinion. In order that the beam 3 may quickly find its point of rest after being subjected to oscillation by the motion of the platform 1, it is under the control of a dash-pot comprising a cylinder 51, pivoted by a link 52 to the scale-beam and working over a piston 53, pivoted in the base 6, thus allowing the beam the requisite freedom of movement, while preventing undue vibration.

In the form of the invention shown in Figs. 8 and 9 the pan or platform 1 is supported by a standard 54, which is laterally deflected to the left at a point within the casing 55 and pivoted to link 57, whence it extends downwardly and is supported upon a laterally-extending beam 58, and the free end of beam 58 is suspended from strap 35. Pivoted to the standard 54 is a rack-bar 60, which engages pinion 61 on index-arbor 62, one end of the rack-bar being free and held in contact with the pinion 61 by a laterally-extending weight 63. The dash-pot is provided with a valve, which opens freely when the weight is imposed on the pan, but which closes when the weight is removed.

What we claim as our joint invention, and desire to secure by Letters Patent, is—

1. In a weighing-scale, the combination of a dial and an index, one of which is movable relatively to the other in an upright plane, and both of which are rotatable around an axis in a plane disposed at an angle to the first plane of movement, a merchandise platform or pan, and an operative connection, with reference to which said dial and index are rotatable about said upright axis, for imparting the movement of the pan or platform to the movable one of the first two said members for moving the same in a plane parallel with the other member.

2. In a weighing-scale, the combination of a dial arranged in an upright plane and rotatable on an upright axis, an index or pointer pivoted to revolve on a horizontal axis and in a plane parallel with the surface of the dial, said pointer being also adapted to revolve about the first said axis, a merchandise platform or pan, and means, with reference to which said dial and pointer are rotatable on said upright axis, operatively connecting said pointer with said merchandise pan or platform.

3. In a weighing-scale, the combination of a casing rotatable on a vertical axis, a dial supported thereby, an index or pointer having pivotal relation to said dial, and movable on a plane disposed at an angle to the plane of movement of the casing, a merchandise pan or platform, and means, with reference to which said casing is rotatable, operatively connecting said pointer or index with said merchandise pan or platform.

4. In a weighing-scale, the combination of a dial and an index, one of which is movable with relation to the other, and both of which are rotatable around an upright axis, a pinion for moving the movable one of the first two said members, a rack-bar engaging said pinion, a rod arranged on said upright axis, a slide journaled on said rod and connected with said rack-bar, a merchandise platform or pan, and means operatively connecting said platform or pan with said rod.

5. In a weighing-scale, the combination of a dial and an index, one of which is movable relative to the other, and both of which are rotatable about an upright axis, a pinion for moving the movable one of the first two said members with relation to the other, a rack-bar engaging said pinion, two slides, to one of which said rack-bar is connected, a rod arranged on said upright axis, and on which rod said slides are journaled, a spring supported on said rod and serving to support the upper one of said slides, means for causing said slides to descend with said rod, a merchandise platform or pan, and means operatively connecting said rod with said pan.

6. In a weighing-scale, the combination of a dial and an index, one of which is movable with relation to the other in an upright plane, and both of which are rotatable about an upright axis and in a different plane to the plane of the first movement, a merchandise platform or pan, a beam on which said pan or platform is supported, operative connection between said beam and the movable one of the first two said members for imparting the said relative movement thereto, arranged on the said upright axis, an involute cam, a pendulum-weight secured thereto, and a flexible connection secured to said beam and supporting the same on the involute face of the cam.

7. In a weighing-scale, the combination of a dial and index, one of which is movable with relation to the other, and both of which are rotatable around an upright axis, a rod operatively connected to the platform, a slide journaled on the rod, guides for said slide, and means operatively related to the slide and one of the first two said members for moving the latter with relation to the other member when the slide is operated.

8. In a weighing-scale, the combination of a dial and index, one of which is movable with relation to the other, and both of which are rotatable around an upright axis, a platform, a rod operatively connected to the platform, guides carried by the frame, a slide swiveled to the rod and movable between said guides, and a connection between the slide and one of the first two of said members for moving the same with relation to the other member when the platform is moved.

9. In a weighing-scale, the combination of a dial and index, one of which is movable relative to the other, and both of which are rotatable about an upright axis, a pinion for moving the movable one of the first two members with relation to each other, a rod arranged on said upright axis, slides journaled on said rod, a spring supported on the rod and serving to support one of the slides, a rack-bar pivotally supported by one of the slides for engaging the pinion, means for retaining the rack in engagement therewith, means for causing the slides to descend with the rod, a merchandise platform or support, and means operatively connecting the rod and platform.

In witness whereof we have hereunto set our hands, this 5th day of August, 1905, in the presence of the subscribing witnesses.

JOSEPH E. COCHRAN.
OLIVER L. PLUMTREE.

Witnesses:
FRANCIS A. HOPKINS,
E. C. SEMPLE.